3,592,856
CONDENSATION REACTIONS WITH BORIC ACID
Robert D. Offenhauer, Pennington, N.J., and Stephen F.
  Nelsen, Madison, Wis., assignors to Mobil Oil Corporation
No Drawing. Filed Dec. 14, 1966, Ser. No. 601,549
Int. Cl. C07c 45/00
U.S. Cl. 260—590                                     12 Claims

ABSTRACT OF THE DISCLOSURE

A process for the condensation of aldehydes and ketones in the presence of boric acid for producing unsaturated aldehydes and ketones.

---

This invention relates to the condensation of carbonyl group-containing compounds in the presence of boric acid as a catalyst to form an unsaturated aldol condensation product. It is characterized by the substantially quantitative yields of product obtainable.

Heretofore, condensations of the type contemplated have been carried out in the presence of bases and strong acids as catalysts but the yields art frequently poor owing to further reaction of the desired product. By virtue of the good selectivity of the present catalyst, there is provided a substantial improvement in yield of product, which may be either an unsaturated aldehyde or an unsaturated ketone. The boric acid catalyst influences the formation of a product which is less reactive than the starting materials, and unlike some conventional catalysts, is able to distinguish between the different reactivities of product and reactants.

The carbonyl-containing compounds are preferably aldehydes and/or ketones. Either may be reacted with itself, or with a compound of the same homologous series, or with a compound of the other homologous series. The reaction of an aldehyde with itself is, of course, the familiar aldol condensation, one aldehyde molecule supplying a carbonyl group and the other an alpha hydrogen, the product being a beta-hydroxy aldehyde, sometimes termed an "aldol." If, the latter contains an alpha hydrogen, as according to the invention is the case, it readily loses water to form an alpha, beta unsaturated aldehyde. The reaction may be illustrated as follows:

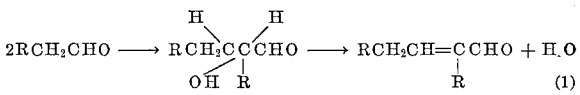

where R may be alkyl or hydrogen. The aldol product loses water and is converted to the unsaturated aldehyde in the same reaction mixture. Ketones also exhibit the aldol condensation, reacting with themselves to give a hydroxy ketone which, if it contains an alpha hydrogen, as according to the invention is the case, can lose water to form an unsaturated ketone. The reaction may be illustrated as follows:

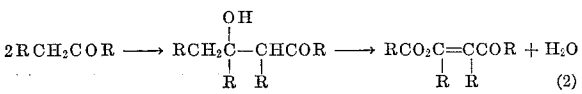

where R may be alkyl or hydrogen. An aldehyde may also react with a ketone, giving a hydroxy ketone which, if it has alpha hydrogen, as is the case, may lose water to form an unsaturated ketone. Thus, the reaction may be written as follows:

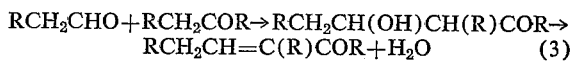

The preferred reaction is that of an aldehyde with itself, or of a ketone with itself. In either case, the reactant should have two to three hydrogen atoms, commonly called alpha hydrogen atoms, connected to the carbon next to the carbonyl group; and preferably the resulting aldol product has an alpha hydrogen, as described. The foregoing holds true when an aldehyde is reacted with another and different aldehyde, or when a ketone is reacted with another and different ketone. In reactions between an aldehyde and a ketone, at least one reactant should have two to three H atoms, i.e., alpha hydrogen atoms, on the carbon next to the carbonyl; the other reactant may or may not contain these particular H atoms.

Suitable specific aldehydes include preferably straight or branched chain alkanals having 1 to 18 carbons, more broadly 1 to 22 carbons, and derived from primary or secondary alcohols. Preferred alkanals are those which are liquid at ambient temperatures and pressures, such as propanal, butanal, pentanal, 3-methylbutanal, heptanal, octanal, decanal, etc. The invention also contemplates aldehydes like methanal, ethanal, and also normally solid alkanals like dodecanal, tetradecannal, hexadecanl, octadecanal, etc. Also aromatic aldehydes like benzaldehyde, for reaction with a reactant having alpha H atoms; also aralkanals like omega-phenylbutanal, omega-phenylethanal, etc. The aldehyde may be unsaturated at positions remote from the carbonyl group.

Preferred ketones may have 3 to 20 or 30 or more carbons, and at least one of the carbons attached to the carbonyl group should have two to three H atoms. Normally liquid ketones are preferred, such as acetone, 2-butanone, 3-methyl-2-butanone, 2-pentanone, 3-pentonone, 2-hexanone, etc. Also useful are normally solid ketones like cholestanone, androsterone, estrone, etc. Also, aromatic ketones like acetophenone, desoxybenzoin, 1-isobutyronaphthone, etc.; and cycloalkanones like cyclohexanone; and ketones like 1-(2-furyl)-butanone. The ketone may have unsaturation at locations remote from the carbonyl group.

The catalyst is boric acid, by which it is intended to include orthoboric acid, $H_3BO_3$, metaboric acid, $HBO_2$, and pyroboric ecid, $H_2B_4O_7$. Also suitable is boron oxide, such as boron sesquioxide, which is capable of reacting with water to give any of the foregoing acids, depending on the amount of water available.

It will be understood that reaction products like alpha, beta unsaturated aldehydes and ketones are valuable. Thus, they find utility as perfumes and perfume ingredients, in pharmaceuticals, as solvents, etc.; some like dypone are useful as plasticizers.

The condensations, which, aside from the use of the present catalysts, are conventional, may be carried out at conventional temperatures, pressures, concentrations, and times. Refluxing temperatures are preferred, as well as ambient pressures. Equimolar concentrations generally are used when the rtactants are different. Reaction times extend from 1 to 100 hours, preferably from 3 to 50 hours. During refluxing, the aldol product loses water, as described, being converted to the unsaturated material, and this may be recovered by conventional procedures, as by distillation, crystallization, solvent extraction, etc. Suitably the water is allowed to distill out as the reaction proceeds, this step being useful when water is the lowest boiling component and does not form an azeotrope with any other component. If desired, an inert sweep gas like nitrogen, methane, ethane, helium, and the like may be employed during the reaction to help remove water.

Another preferred step comprises adding an azeotroping agent to the reaction mixture to form an azeotrope with the water which will distill out at a temperature lower than the boiling point of any other component. This step is of value in any case where it is desired to facilitate removal of water and/or to remove it completely; it is of particular value when one or more of the other components is of such volatility as to distill over in the absence of the azeotrope. Conventional azeotroping agents are useful, including hydrocarbons like benzene, toluene, xylene, naphtha, and also agents like dibutyl ether.

Also serviceable is the use of a water trap, such as a Dean-Stark trap, which permits water leaving the reaction mixture to be condensed and removed from the system without interfering with the condensation and return of any other component, including solvents.

Still another useful water removal step comprises adding to the reaction mixture an agent which reacts with the water but which is otherwise non-injurious to the reactants and product. A particularly useful agent of this class is boron sesquioxide, which reacts with water to form boric acid. With limited amounts of water, this oxide forms metaboric acid, and with ample water it forms orthoboric acid.

Another water removal step comprises adding to the reaction mixture a water-soluble solvent, or a water-soluble reactant like acetone, methyl ethyl ketone, diethyl ketone, acetaldehyde, etc., and distilling the resulting solution from the mixture, this solution containing the water formed in the reaction. Such solvent or reactant may be dried and reused.

It is desirable to add a solvent to the reaction mixture to maintain the reactants in good contact with each other and with the catalyst. Suitable solvents are aromatic hydrocarbons like benzene, toluene, the xylenes, ethylbenzene, and the like. Especially desirable are compounds like benzene and toluene, which also function as azeotroping agents. Other solvents are organic solvents like ligroin, ether, chloroform, carbon tetrachloride, various chlorinated ethanes, etc.

Conversions range from 20 to 100%, based on the starting aldehyde or ketone, while the yield of desired product is substantially quantitative.

The invention may be illustrated by the following examples.

EXAMPLE 1

Heptanal was condensed with itself by refluxing a mixture of 37.6 g. of heptanal, 12.4 g. boric acid, and 250 ml. m-xylene, using a Dean-Stark water trap. After 18 hours, vapor phase chromatographic analysis showed that all of the heptanal was gone and, by comparison with a standard sample, that a 97% yield of 2-pentyl-2-nonenal had been formed. The product was isolated by distillation and further identified by infrared spectroscopy (comparison with a known spectrum).

EXAMPLE 2

Benzaldehyde was condensed with acetophenone by refluxing a mixture of 10.6 g. benzaldehyde, 12.0 g. acetophenone, 6.1 g. boric acid, and 100 g. toluene, using a Dean-Stark water trap. VPC analysis after 21 hours showed an approximately 60% conversion to benzacetophenone, which was collected and identified by infrared spectroscopy. The yield was nearly quantitative.

EXAMPLE 3

Acetophenone was condensed with itself, using m-xylene as solvent, and then again using acetophenone as solvent. In the first run, 2.4 g. acetophenone, 10.0 g. m-xylene, and 0.5 g. boric acid were mixed and refluxed 47 hours, using a water trap, from which there resulted and 18% conversion to dypnone, i.e., trans-1-benzoyl-2-phenylpropene. The yield was nearly quantitative. This product was identified by comparison of its infrared spectrum with that of the known spectrum. In the second run, 10.0 g. acetophenone and 0.5 g. boric acid were mixed and refluxed 10 hours with a water trap, resulting in a 63% conversion to dypnone. Yield was nearly quantitative.

EXAMPLE 4

Boron sesquioxide was first formed by dehydrating a 6-g. sample of boric acid at 192° C. and 15 mm. To the boron oxide thus formed there was added a solution of 22.8 g. heptanal in 50 ml. dioxane, and the resulting mixture was refluxed 16 hours, giving a 39% conversion to 2-pentyl-2-nonenal.

It will be understood that the invention is capable of obvious variations without departing from its scope.

In the light of the foregoing description, the following is claimed.

What is claimed is:

1. Method of reacting a first carbonyl-group containing compound with a second carbonyl-group containing compound to form a condensation product and water, said first compound being selected from the group consisting of aldehydes and ketones represented by the formula $$RCH_2COR$$

wherein each R is independently alkyl or hydrogen and said second compound being selected from the group consisting of aldehydes and ketones represented by the formula $$RCH_2COR$$

wherein each R is independently alkyl or hydrogen which comprises carrying out the reaction in the presence of a catalyst consisting essentially of boric acid or boron oxide to produce an unsaturated product of higher molecular weight than either of said reactant compounds, said products being selected from aldehydes and ketones, and removing water as formed, in the reaction.

2. Method of claim 1 wherein said first and second carbonyl compounds are one and the same.

3. Method of claim 1 wherein said first and second carbonyl compounds are different.

4. Method of claim 1 wherein each said first and second carbonyl group-containing compound is an aldehyde and said product is an aldehyde.

5. Method of claim 1 wherein each said first and second carbonyl group-containing compound is a ketone and said product is a ketone.

6. Method of claim 1 wherein said first carbonyl compound is a ketone and the second is an aldehyde, and said product is a ketone.

7. Method of claim 1 wherein said catalyst is boric acid.

8. Method of claim 1 wherein the reaction is carried out under refluxing conditions.

9. Method of claim 1 wherein water is removed by distillation.

10. Method of claim 1 wherein water is removed by adding an azeotroping agent to the reaction mixture to form an azeotrope with water, and distilling the azeotrope from the mixture.

11. Method of claim 1 wherein water is removed by adding boron sesquioxide to the reaction mixture to react with the water to form additional quantities of boric acid.

12. Method of claim 1 wherein a water-soluble material is present in the reaction mixture to dissolve the water, and distilling the resulting solution from the mixture.

References Cited

UNITED STATES PATENTS 2,309,650   2/1943   McAllister et al. _____ 260—593

FOREIGN PATENTS 298,349   10/1928   Great Britain _____ 260—602
614,755    2/1961   Canada _____ 260—593

OTHER REFERENCES

Kuskov et al.: Chemical Abstracts, vol. 54, col. 20974c, 1960.

BERNARD HELFIN, Primary Examiner

R. H. LIES, Assistant Examiner

U.S. Cl. X.R.

260—347.8, 586R, 593R, 599, 601R

PO-1050
(5/69)

UNITED STATES PATENT OFFICE
CERTIFICATE OF CORRECTION

Patent No. 3,592,856        Dated July 13, 1971

Inventor(s) ROBERT D. OFFENHAUER and STEPHEN F. NELSEN

It is certified that error appears in the above-identified patent and that said Letters Patent are hereby corrected as shown below:

Column 1, line 50, at end of formula (I), "H O" should be read $--H_2O--$.

Column 1, line 63, in formula (2), "$RCO_2\underset{R}{C}$" should be read $--RCH_2\underset{R}{C}--$.

Column 2, line 31, "tetradecannal" should be read --tetradecanal--; "hexadecanl" should be read --hexadecanal--.

Column 2, line 41, "3-pento" should be read --3-penta--.
Column 2, line 51, "ecid" should be read --acid--.
Column 2, line 59, "dypone" should be read --dypnone--.
Column 2, line 65, "rtactants" should be read --reactants--.
Column 4, line 10, "and" should be read --an--.

Signed and sealed this 29th day of February 1972.

(SEAL)
Attest:

EDWARD M. FLETCHER, JR.       ROBERT GOTTSCHALK
Attesting Officer               Commissioner of Patents